United States Patent Office 3,791,989
Patented Feb. 12, 1974

3,791,989
CATALYST REJUVENATION WITH OXALIC ACID
David S. Mitchell, San Rafael, Alan G. Bridge, El Cerrito, and Joseph Jaffe, Berkeley, Calif., assignors to Chevron Research Company, San Francisco, Calif.
No Drawing. Continuation-in-part of abandoned application Ser. No. 799,124, Feb. 13, 1969. This application Mar. 12, 1971, Ser. No. 123,828
Int. Cl. B01j 11/02, 11/76
US. Cl. 252—413                                    1 Claim

ABSTRACT OF THE DISCLOSURE

Process for removing vanadium sulfide from used hydrotreating catalyst particles comprising Group VI or Group VIII metals by contacting said catalyst particles with an aqueous solution comprising oxalic acid before burning coke from the used catalyst particles.

CROSS-REFERENCE

This application is a continuation-in-part of patent application Ser. No. 799,124, filed Feb. 13, 1969, now abandoned.

BACKGROUND OF THE INVENTION

Field of the invention

This invention relates to a method for treating a catalytic composite useful in the conversion of higher boiling hydrocarbons to lower boiling hydrocarbons such as gasoline, and in the removal of impurities from higher boiling hydrocarbons such as fuel oil. More particularly, the present invention is concerned with a method for treating catalysts which have become plugged or fouled by metal contaminants. The present invention still more specifically is directed to a method for rejuvenating catalysts used in hydroprocessing, in which processing the catalyst pores frequently become plugged with vanadium sulfide.

Description of the prior art

Various methods have been disclosed for removing metals from catalyst particles. Many of these methods have comprised expensive abrasive contacting of the catalyst so as to wear off the metal.

For catalytic cracking catalysts a number of methods have been disclosed for removing metals from the catalyst by contacting the catalytic cracking catalysts with a solution so as to dissolve the metal and thus remove it from the catalysts. For example, U.S. Pat. 1,904,582 discloses a process for removing metal poisons from catalytic cracking catalysts using strong hydrochloric acid. U.S. Pat. 3,105,104 discloses a method for removing nickel and vanadium poisons from catalytic cracking catalysts. According to the process of U.S. Pat. 3,105,104 the metal poisons are first converted to oxides, then to sulfides and then to chlorides so that they may be more readily washed from the catalysts. U.S. Pat. 3,148,155 discloses the use of sulfurous acid together with a metals complexing species to remove metallic poisons from catalytic cracking catalysts. U.S. Pat. 3,168,481 discloses the use of a basic pH aqueous solution containing ammonium ions to remove vanadium from catalytic cracking catalysts.

U.S. Pat. 2,380,731 discloses a process directed to removal of iron from catalytic cracking catalyst using an inorganic acid such as hydrochloric acid or an organic such such as oxalic or acetic or lactic acid. Oxalic acid is preferred according to the process of U.S. Pat. 2,380,-731 because of the increased efficiency due to formation of complex iron-oxalate anions. In addition to iron, metals which may be removed in accordance with the process of U.S. Pat. 2,380,731 include magnesium, chromium, copper, vanadium, strontium, lithium, sodium and lead. Thus, U.S. Pat. 2,380,731 does not show a process which is selective for the removal of vanadium sulfide from catalyst particles. More particularly, U.S. Pat. 2,380,731 does not disclose a process for the removal of vanadium sulfide from a catalyst containing Group VI and/or Group VIII metals. Contrarywise, the patent shows the use of oxalic acid to remove numerous metals from a refractory inorganic support such as a clay or alumina or silica or an alumina-silica refractory catalytic cracking catalyst.

In hydroprocessing (e.g. hydrocracking or hydrotreating) various hydrocarbon feeds, particularly heavy or residual hydrocarbon feeds which contain a high parts per million vanadium concentration, severe catalyst metals plugging frequently results. For fixed bed hydroprocessing, metals such as iron and sodium contained in the hydrocarbon feed deposit interstitially in the bed of catalyst particles, that is, the iron and sodium deposit between the catalyst particles, or on the outside surface of the catalyst. On the other hand, vanadium poses a special problem in that it deposits predominantly in the pores of the catalyst.

Due to the deposition of the vanadium and other poisoning metals, the hydroprocessing catalyst is deactivated so that at reasonable operating temperatures the hydroprocessing does not accomplish satisfactory sulfur and nitrogen removal nor satisfactory conversion of the hydrocarbon feed to improved, valuable hydrocarbon products. Thus, it is very desirable to either prevent the metals, which are usually in the form of oil soluble organometallic compound, from entering the catalyst bed to begin with or to have a feasible method to remove the metals from the catalyst, that is, to rejuvenate the catalyst.

As discussed above, numerous methods have been used for rejuvenating catalytic cracking catalyst. However, the catalytic cracking catalyst differs notably from hydroprocessing catalyst in that the catalytic cracking catalyst is in most instances essentially entirely a refractory material such as alumina and/or silica. The catalytic cracking catalyst does not contain Group VI or Group VIII metals such as nickel and molybdenum. However, for hydroprocessing Group VI and Group VIII metals are essentially always present in the catalyst particles and are very important for the catalytic hydrogenation-dehydrogenation reactions which usually take place in hydroprocessing of hydrocarbons. Thus hydroprocessing catalyst which is fouled with vanadium poses a special problem in that it is desired to remove the vanadium, vanadium sulfide or other compounds of vanadium from the pores of the catalyst while at the same time not removing the relatively expensive Group VI and Group VIII metals such as nickel and molybdenum.

In Industrial and Engineering Chemistry, vol. 2, No. 1, March 1963, Harold Beuther and R. A. Flinn report on metals removal from catalyst in their article entitled "Technique for Removing Metal Contaminants from Catalysts." It is stated therein, "The fact that the metals are deposited in an organically combined state is of interest in attempting to devise techniques capable of extracting these metals from the catalyst. Although still combined in an organic structure, the over-all metallo-organic is probably embedded in a coke matrix from which chemical extraction would be difficult. The porphyrins themselves are rather resistant to chemical decomposition, as is the coke; it, therefore, appears that chemical extraction of the metals from the "coked" catalyst would be quite difficult. On the other hand, in the oxidized form, such as $V_2O_5$, the metals should be reasonably susceptible to chemical attack. Accordingly, the oxidized catalysts were chosen for chemical extraction studies, and hydrogenation catalysts were studied after regeneration to obtain the oxidized form of the metal." (emphasis added). Then the authors go on to point out aqueous oxalic acid can remove $V_2O_5$ from catalyst surfaces, but that the oxalic acid also removes molybdenum oxide from the catalyst surfaces.

Thus, the Beuther-Flinn article teaches (a) that removal of a vanadium contaminant from coked catalyst would not be expected to be successful if a chemical extraction method is used, and (b) that substantial amounts of molybdenum would be removed in addition to vanadium for the catalyst which Beuther and Flinn treated using aqueous oxalic acid. The term "coked" catalyst is used to refer to the carbonaceous deposits which accumulate on catalysts from use in catalyzing hydroprocessing reactions.

U.S. Pat. 3,020,239, titled "Removal of Vanadium from a Supported Molybdenum-containing Catalyst," issued to R. A. Flinn corresponds to the article by Beuther and Flinn mentioned above. U.S. Pat. 3,020,239 shows removal of large amounts of molybdenum relative to the vanadium which is removed from catalyst particles in an oxalic acid extraction procedure.

SUMMARY OF THE INVENTION

According to the present invention, a process is provided for rejuvenating a coked hydroprocessing catalyst comprising at least a Group VI metal or compound thereof and a Group VIII metal or compound thereof, and a contaminant selected from vanadium and compounds thereof, which comprises removing from said catalyst at least 30 weight percent of said contaminant, calculated as metal, by contacting said catalyst with an aqueous solution of oxalic acid before the coke is burned off the catalyst particles.

The present process for vanadium removal is preferably applied to catalyst particles comprising Group VI and/or Group VIII metals impregnated onto an organic material selected from the group consisting of silica, alumina and mixtures thereof. After impregnation of the metals onto the support the catalyst particles are then calcined. Preferably the catalyst particles rejuvenated according to the present invention are catalyst particles which were calcined at a temperature of 400° F. or more prior to being used for hydroprocessing.

According to the present invention, a large part of the vanadium (usually in the form of vanadium sulfide) contained in the fouled catalyst is removed by contacting the catalyst with an aqueous solution comprising oxalic acid, but yet substantially all of the catalytic Group VI and Group VIII metals originally contained in the calcined catalyst particle remain in the catalyst particle. Thus 30, 40, or even 70 weight percent of the vanadium (calculated as the pure metal) is removed from the fouled catalyst particle while removing little of the Group VI and Group VIII metals, that is, removing less than 25 percent and usually less than 15 weight percent of the original Group VI and Group VIII metals from the catalyst particle.

It should be noted that in some instances nickel is deposited on the catalyst due to organo-nickel compounds in the feed. This deposited nickel is not included, of course, as part of the "original" nickel or Group VIII metals referred to in the previous paragraph. Also, it should be understood that although in the present invention the vanadium is removed before coke is burned off the used catalyst, it is not to be implied that a coke burn-off step must follow the vanadium removal step in order to come within the present invention. However, usually a coke burn-off step will be employed after the vanadium removal.

Thus, according to the present invention, where the catalyst particle to be rejuvenated comprises nickel and molybdenum or compounds thereof on an inorganic support, at least 30 weight percent of the vanadium sulfide or vanadium contaminant (calculated as the pure metal) is removed from the catalyst particle but less than 15 percent of the original nickel and molybdenum is removed from the catalyst particles during the contacting of the catalyst particle with the aqueous solution of oxalic acid.

EXAMPLE 1

Catalyst particles fouled with vanadium sulfide were obtained from a hydroprocessing unit. Hydroprocessing is used in this specification to include any type of high hydrogen partial pressure (above 100 p.s.i.a. hydrogen partial pressure) processing of hydrocarbons to improve the characteristics of the hydrocarbon feed, as, for example, to convert the hydrocarbon feed at least partially to gasoline. In the present example the hydroprocessing was a combination of hydrotreating (lowering the sulfur and/or nitrogen content of the feed hydrocarbon) and hydrocracking (lowering the average molecular weight of the hydrocarbon feed). The pressure for the combined hydrotreating-hydrocracking process was about 2300 p.s.i.a. and the temperature was about 770° F. The feed hydrocarbon had an API gravity of 18.6, a boiling range of about 700° F. to about 1200° F. and contained 3.5 parts per million vanadium. The feed was passed together with 5,000 standard cubic feet of hydrogen per barrel of hydrocarbon feed over a fixed bed of catalyst particles. The catalyst was comprised of nickel and molybdenum sulfide on an alumina-silica support. The composition of the fresh catalyst was about 5 percent nickel, 18 percent molybdenum, both as oxides, with the remainder alumina and silica in a 4:1 weight ratio. The catalyst was prepared by taking calcined alumina-silica and impregnating once with nickel nitrate solution and once with ammonium molybdate solution with drying and 900° F. air calcination after each impregnation.

Thirty-eight grams of the fouled catalyst resulting from several months of hydroprocessing operation were obtained from the fixed catalyst bed. This catalyst was boiled with approximately 200 milliliters of a concentrated solution of oxalic acid. The concentration of the oxalic acid in the aqueous solution was approximately one part oxalic acid by weight to one part water. Upon introducing the fouled catalyst particles into the hot aqueous oxalic acid solution frothing occurred. After about 30 minutes the catalyst particles were removed from the solution. Before rejuvenation the catalyst particles contained about 8.8 weight percent nickel, 6.2 weight percent molybdenum and 2.1 weight percent vanadium. After washing the catalyst particles with the hot oxalic acid solution the vanadium content was 1.3, which is a reduction of about 38 percent in vanadium content. Although the vanadium removal was not complete, the removal is believed to be sufficient to substantially rejuvenate the catalyst. Little of the nickel and molybdenum were removed from the catalyst. This is shown by an emission spectograph analysis of the wash solution based on catalyst weight (i.e. 38 grams), the weight percent of metals in the solution used to wash the catalyst was 3 weight percent nickel, 0.4 weight percent molybdenum, and 59.3 weight percent vanadium (all calculated as the pure metal). Thus, it is evident from the wash water solution analysis that the process of the present invention has been found to be very selective for the removal of vanadium sulfide from hydroprocessing catalyst containing Group VI and/or Group VIII metals. It was also significant that the catalyst had not lost any strength as a result of this treatment.

Example 2

Table I summarizes data showing the effectiveness of the process of the invention for removing vanadium from catalyst containing Group VI metals, and in particular a catalyst containing molybdenum, without removing substantial amounts of molybdenum relative to the vanadium.

Table II tabulates in more detail the test data and procedure for this set of exemplary data.

TABLE I.—(SUMMARY TABLE)

| | | Washed catalyst[1] analysis, weight percent | P.p.m. V in the 200 ml. wash solu. after catalyst has been washed | P.p.m. Mo in the 200 ml. wash solu. after catalyst has been washed |
|---|---|---|---|---|
| 1 | Oxalic acid wash of catalyst after coke burned off (run D). | Ni 4.7<br>Mo 2.8<br>V 1.3<br>Fe 2.1 | 352 | 409 |
| 2 | Oxalic acid wash of catalyst before coke burned off (run C). | Ni 5.8<br>Mo 4.4<br>V 1.6<br>Fe 3.1 | 94 | 20 |

[1] Unwashed catalyst analysis, wt. percent: Ni, 10; Mo, 5; V, 5.

TABLE II.—OXALIC ACID WASHING OF SPENT CATALYST

| | | A | B | C | D | E |
|---|---|---|---|---|---|---|
| 1 | Take 20 ml. (=2½ g.) of screened (12 mesh) spent catalyst | Yes | Yes | Yes | Yes | Yes. |
| 2 | Perform a standard pill burn, 4 hrs. at 400° F., 2 hrs. at 700° F., 5 hrs. at 950° F., 4 d. plus 3/hr. air. | | | | Yes | Yes. |
| 3 | Wash with an oxalic acid solution made up as follows: 200 ml. distilled water, 20 g. oxalic acid, 1 ml. NiW detergent. Add the spent catalyst to the oxalic acid solution at ambient temperature. Allow to stand for 2 hours. Stir occasionally. | | | | Yes | Yes |
| 4 | Wash with an oxalic acid solution made up as follows: 200 ml. distilled water, 20 g. oxalic acid, 1 ml NiW detergent. Add the spent catalyst to the oxalic solution. Heat to 200° F., allow to stand for 2 hours. Stir occasionally. | | | Yes | | Yes. |
| 5 | Wash with an oxalic acid solution made up as follows: 200 ml. distilled water, 60 g. oxalic acid, 1 ml. NiW detergent. Heat to 200° F. to dissolve the oxalic acid. Add the spent catalyst to the oxalic acid solution, Keep at 200° F. for 2 hours. Stir occasionally. | | Yes | | | |
| 6 | Filter the catalyst from the wash solution, using a Buchner funnel under vacuum. Dry in steam oven at 212° F. for 24 hrs. | Yes<br>  | Yes<br>Yes | Yes<br>Yes | Yes<br>Yes | Yes.<br>Yes. |
| 7 | Send out approx. 10 washed catalyst pills for X-ray fluoresence analysis (wt. percent). | 6.7<br>4.9<br>1.7<br>3.2 | 5.8<br>4.4<br>1.6<br>3.1 | 4.7<br>2.8<br>1.3<br>2.1 | 10.7<br>4.8<br>1.6<br>3.2 | |
| 8 | Send out the filtrate for EMS analysis (p.p.m. unless otherwise indicated). | .098 m.g/ml<br>81<br>.96 mg./ml.<br>.29 mg./ml. | .23 mg./ml.<br>35<br>.76 mg./ml.<br>.89 mg./ml. | 20<br>20<br>94<br>76 | 77<br>409<br>352<br>438 | .55 mg./ml.<br>2,260.<br>2.3 mg./ml.<br>2.2 mg./ml. |
| 9 | Send out approx. 10 pills of spent, unwashed catalyst for X-ray fluoresence analysis (wt. percent). | Ni~10<br>Mo~5<br>V~5 | | | | |
| 10 | Metals in filtrate based on wt. percent catalyst. | .08 Ni<br>.084 Mo<br>.77 V<br>.23 Fe | .185 Ni<br>.031 Mo<br>.61 V<br>.71 Fe | 0.017 Ni<br>0.017 Mo<br>0.085 V<br>0.066 Fe | 0.068 Ni<br>0.36 Mo<br>0.31 V<br>0.39 Fe | .44 Ni.<br>1.99 Mo.<br>1.85 V.<br>1.76 Fe. |

Although various specific embodiments of the invention have been described and shown, it is to be understood they are meant to be illustrative only and not limiting. Certain features may be changed without departing from the spirit or essence of the invention. It is apparent that the present invention has broad application to the removal of Vanadium from various used hydroprocessing catalysts containing Group VI and/or Group VIII metals before burning coke off the used hydroprocessing catalyst. Accordingly, the invention is not to be construed as limited to the specific embodiments illustrated but only as defined in the appended claims.

What is claimed is:

1. A process for rejuvenating a coked hydroprocessing catalyst comprising molybdenum with an inorganic material selected from the group silica, alumina, and mixtures thereof, and vanadium sulfide contaminant, said catalyst having pores plugged with said sulfide as a result of hydroprocessing a hydrocarbon feed containing organometallic vanadium compounds, which process comprises removing from said catalyst at least 30 weight, percent of said contaminant, calculated as metal, by contacting said catalyst at an elevated temperature with an aqueous concentrated solution of oxalic acid before the coke is burned off the catalyst particles.

References Cited
UNITED STATES PATENTS

| | | | |
|---|---|---|---|
| 3,020,239 | 2/1962 | Flinn et al. | 252—413 |
| 2,380,731 | 7/1945 | Drake et al. | 252—413 |
| 3,122,511 | 2/1964 | Foster | 252—413 |
| 3,562,150 | 2/1971 | Hamilton et al. | 252—412 |
| 2,704,281 | 3/1955 | Appell | 252—413 |

DANIEL E. WYMAN, Primary Examiner

P. E. KONOPKA, Assistant Examiner

U.S. Cl. X.R

208—216; 252—414